US006653583B1

(12) United States Patent
Asa

(10) Patent No.: US 6,653,583 B1
(45) Date of Patent: Nov. 25, 2003

(54) LIMIT SWITCH

(75) Inventor: Yukihiro Asa, Tokyo (JP)

(73) Assignee: Asa Electronic Industry Co., Ltd., Tokyo (JP)

(*) Notice: Subject to any disclaimer, the term of this patent is extended or adjusted under 35 U.S.C. 154(b) by 0 days.

(21) Appl. No.: 10/252,075

(22) Filed: Sep. 20, 2002

(30) Foreign Application Priority Data

Jun. 11, 2002 (JP) ........................................ 2002-17001

(51) Int. Cl.[7] ................................................ H01M 1/34
(52) U.S. Cl. ........................ 200/249; 200/332; 200/835
(58) Field of Search ................................ 200/573, 574, 200/302.1, 249, 302.2, 302.3, 47, 82 R, 83 R–83 J

(56) References Cited

U.S. PATENT DOCUMENTS 3,898,405 A * 8/1975 Weber ........................ 200/83 J
4,827,093 A * 5/1989 Strzodka ................... 200/82 C
5,140,113 A * 8/1992 Machado .................. 200/83 J
6,399,908 B1 * 6/2002 Mueller et al. ............ 200/249

FOREIGN PATENT DOCUMENTS

DE WO 98/45865 * 10/1998 ................ 200/249

* cited by examiner

*Primary Examiner*—Lincoln Donovan
*Assistant Examiner*—M. Fishman
(74) *Attorney, Agent, or Firm*—Flynn, Thiel, Boutell & Tanis, P.C.

(57) ABSTRACT

A limit switch sealing a non-contact type microswitch has a stainless steel actuator lever subjected to nitriding processing which is cantilever supported on a housing upper portion by a plate spring made of polyimide. A non-contact type microswitch stored inside a housing cavity is slightly adjusted for upward and downward positions by a screw mechanism, and after that, is sealed inside the cavity by the filler such as silicon rubber and the like. A piston which transmits the movement of the actuator lever to the microswitch is supported air tight by the housing at the center of a flat conical bellows, and the limit switch including a return coil spring is highly sensitive, and is excellent in water resistance, oil resistance, abrasion resistance and durability.

12 Claims, 2 Drawing Sheets

LIMIT SWITCH

BACKGROUND OF THE INVENTION

1. Field of the Invention

The present invention relates to a limit switch which limits or controls a movement, and, in particular, to a constitution of a non-contact type microswitch extensively used for industrial purpose which comprises water resistance, corrosion resistance and abrasion resistance. It is to be noted that the limit switch is a switch to detect a position, a displacement, a movement, a passage and the like, and the microswitch is defined as a compact type switch designed and produced so that a switching operation to open and close an electrical current can be promptly and reliably performed with a small force.

2. Description of the Related Art

A conventional limit switch generally has an actuator of a lever type rotatably supported by a hinge, and when a free end of the actuator is pushed and moved by a cam and a dog of an operational mechanism, the movement thereof is transmitted to a slide pin, and by a snap action of a toggle mechanism and the like, a contact thereof is switched to OFF from ON or ON from OFF, so that a signal is outputted and an operation of a moving mechanism is detected.

However, since an urging force which actuates the limit switch receives resistance due to a reaction accompanied with a snap action of the contact by moving the actuator lever, an urging force large enough to overcome the resistance is required. Therefore, in order to avoid an influence, which exerts a counteraction on the function, it is better that an operating force of the limit switch is as weak as possible. Further, in bad surroundings where the limit switch is used not only for industrial machines, but also for field equipment of civil engineering, building construction and the like, abrasion due to accumulation of dust and repeated operations is unavoidable for a spindle of the hinge which supports the lever to function as the actuator. A sealed microswitch of JIS C 4508 is a large type, and is difficult to use conveniently for the places, which require a compact construction.

SUMMARY OF THE INVENTION

Therefore, the object of the present invention is to provide a general type limit switch, which has abrasive resistance, corrosion resistance and water resistance, and is excellent in durability and, moreover, can function with a weak operating force.

In order to achieve the above-described object, the limit switch according to the present invention is a flat box type housing as a basic model with a cavity concavely provided, and an outer surface of the housing comprises: two surfaces backward and forward in a thickness direction where mounting holes are piercingly provided at standard positions (a center distance between two places of mounting holes according to JIS C 4505 is: 25.4 mm) and which function as mounting surfaces; an upper surface which defines upper edges of these two surfaces and supports an actuator lever; and an under surface which defines under edges of these two surfaces and where the cavity is open, wherein a non-contact type microswitch is provided inside the cavity with upper and lower positions adjustable; and the actuator lever is supported on the upper surface by a cantilever plate spring; and a piston connecting the actuator lever and the microswitch is insertably mounted between both of them; and an annular concave portion circumference on the upper surface, where a piercing hole to fittingly mount the piston by being connected with the cavity is open, is sealed at the outer edge of the elastic membrane which supports the piston by seal-connecting the piston with the center potion; and, moreover, the cavity which stores the microswitch is filled with a sealing agent.

In two surfaces which function as the mounting surfaces, low small protrusions are convexly provided on at least two places of one side, and in the corresponding position of the other side, hole portions to fit the small protrusions are concavely provided. Further, the plate spring is formed by polyimide, and the elastic membrane is formed by a disc bellows having an inclination along a flat conical surface with polyimide as a raw material. Further, the actuator lever is formed by stainless steel (SUS304) and the surface thereof is subjected to nitriding processing. In addition, a top end of the actuator lever is extended to the housing side, and a square hole which controls a moving range is piercingly provided at a position facing the housing side so as to idly fit to a protrusion of the housing side. On the other hand, a compression coil is insertably mounted between the piston and a mounting board of the microswitch and supports a weight of the piston and an urging force by the elastic membrane. Further, the mounting board of the microswitch is provided with an external thread on an outer periphery thereof and screwed into an internal thread provided on a piercing hole of the housing, and the mounting board of the microswitch is rotated so as to move a position relative to the actuator lever by a screw mechanism and a distance of an operating position by the actuator lever for a free position of the microswitch is made adjustable.

BRIEF DESCRIPTION OF THE DRAWINGS

FIG. 1(*a*) is a top plane view, and FIG. 1(*b*) is a cross sectional view cut along the line B—B in FIG. 1(*a*);

DESCRIPTION OF THE PREFERRED EMBODIMENT

Figure 1A:
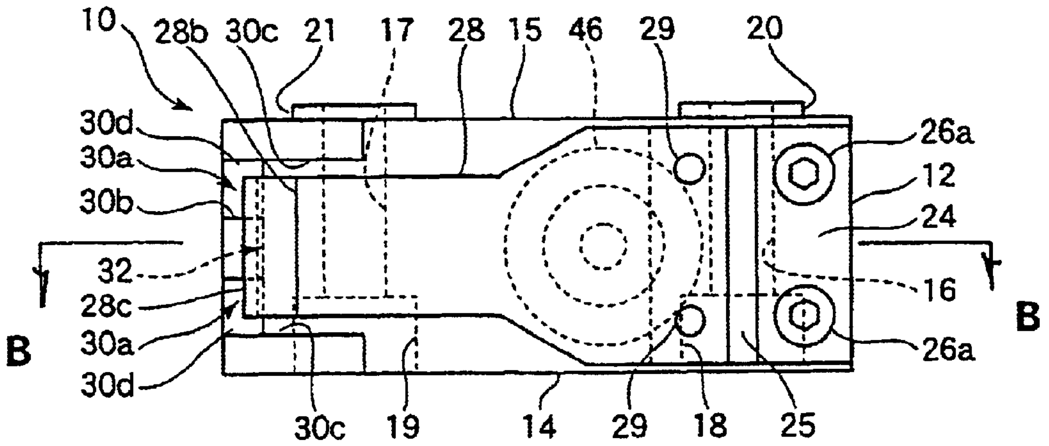
FIGS. 1(*a*) and 1(*b*) show one embodiment of a limit switch according to the present invention.
Figure 1B:
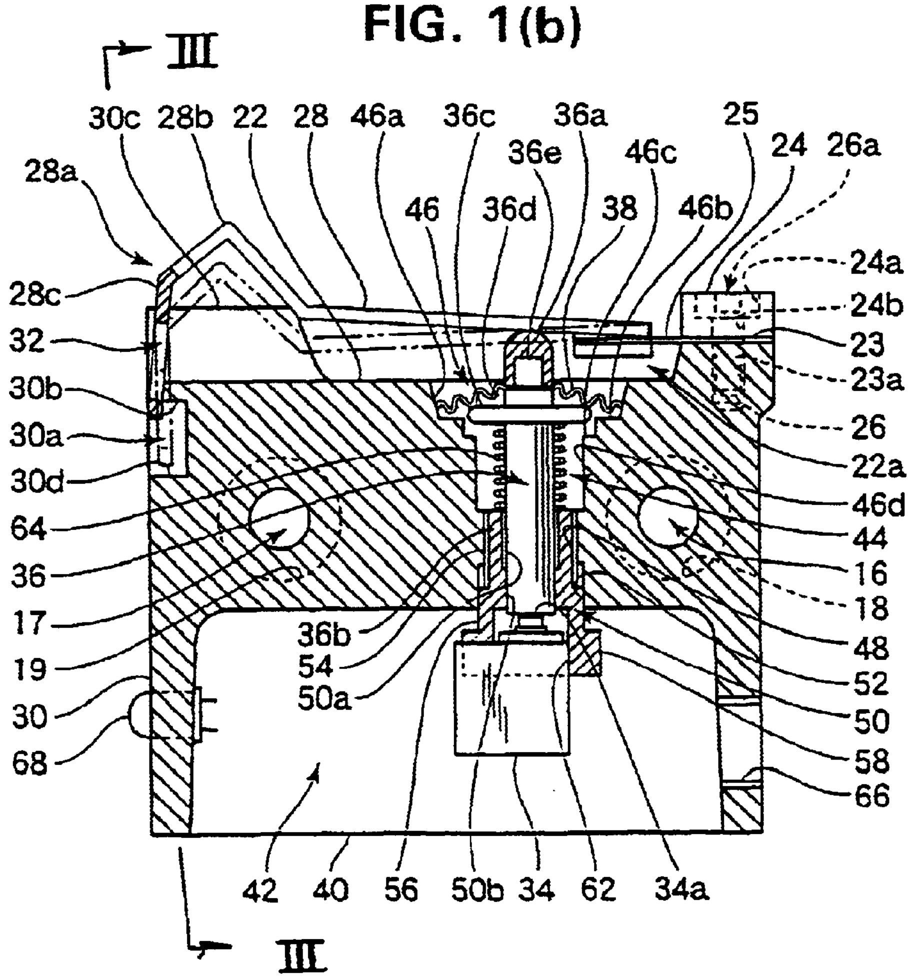
Figure 2:
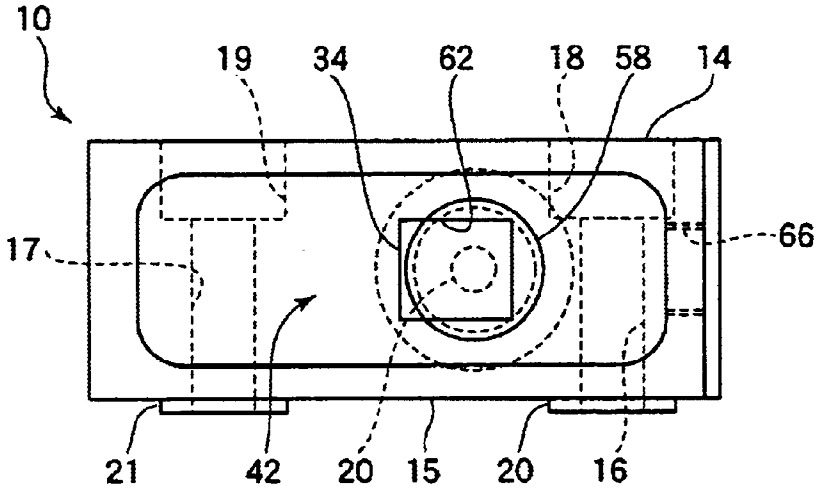
FIG. 2 is a bottom plane view of the limit switch of FIG. 1(*a*)
Figure 3:
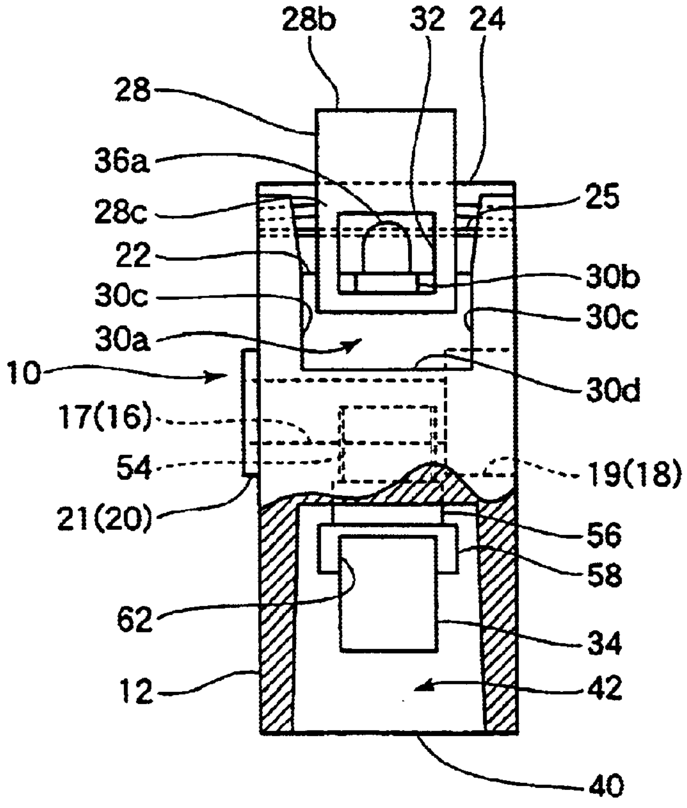
FIG. 3 is a side view of a partial cross-sectional view cut along the line III—III in FIG. 1(*b*).

Hereinafter, an embodiment of a limit switch according to the present invention will be described based on the drawings. FIGS. 1(*a*) and 1(*b*) show one embodiment of a limit switch 10 according to the invention, and FIG. 1(*a*) is a plane view and FIG. 1(*b*) is a sectional view cut along the line B—B in FIG. 1(*a*). Further, FIG. 2 is a bottom plane view of the embodiment shown in FIG. 1(*a*), and further FIG. 3 is a side view of a partial sectional view cut along the line III—III in FIG. 1(*b*). Phantom lines show elements in FIGS. 1(*a*), 1(*b*), 2 and 3.

A housing 12 of the limit switch 10 is an aluminum die cast molded article piercingly provided with mounting holes 16, 17 which pass through two surfaces (surface parallel to the paper surface of FIG. 1(*b*) 14, 15 frontward and backward in a thickness direction at two places. A center distance between the mounting holes 16, 17 is preferably set to 25.4 mm based on JIS C 4505 standard. Front surface 14 side opening of the mounting holes 16, 17 is concavely provided with counter sinking holes 18, 19 which sink heads of mounting bolts (not shown), and low small protrusions 20, 21 loosely fittable to the counter sinking holes 18, 19 are convexly provided on the periphery of the rear surface 15 of the mounting holes 16, 17.

Hence, for example, by providing a concave portion, to which the small protrusions 20, 21 are fittable, on a mounting member (not shown), the position of the limit switch can be easily and precisely decided.

FIG. 1(*b*), screw holes 23*a* are carved at two places of a seat 23 provided at right side in the drawing of the upper surface 22 which defines the upper edges of the frontward and backward two surfaces 14, 15, and bolt holes 24*b* are piercingly provided at two places at positions aligned with the holes 23*a* in the plate spring 25 of polyimide and a clamp 24, respectively. A plate spring 25 is piercingly provided between the seat 23 and the clamp 24, and a bolt 26 inserted into the bolt hole 24*b* is screwed into the screw hole 23*a* and clamped, and the plate spring 25 is compressed and fixed to the seat 23 by the clamp 24. In the clamp 24 is concavely provided a counter sinking hole 24*a* which sinks a head 26*a* of the bolt 26. The plate spring 25 is detachable by this bolt connection so that, when dust is accumulated in a gap 22*a* between the upper surface 22 and the plate spring 25, it is possible to remove and clean the plate spring 25. In the case where the plate spring 25 suffers an accidental damage from an external force, the plate spring 25 has advantages of being exchanged.

Reference numeral 28 denotes an actuator lever, which is connected with a free end of the plate spring 25 by a rivet 29. The actuator lever 28 is formed by a plate of stainless steel (SUS304) and is subjected to nitriding processing, and therefore, is excellent in corrosion resistance and abrasion resistance, and has little friction. Hence, there is a considerable degree of freedom in an operating direction by an operating member such as a dog, a cam and the like, and an exact vertical degree for an edge line of a sliding portion 28*b* is not necessarily required. Since the actuator lever 28 is supported by the plate spring 25 having a cantilever constitution, an axis or a bearing that wears by receiving rotation does not exist. Accordingly, the actuator lever 28 does not require lubrication, and abrasion is not expedited by insertion of dust and rust.

A free end 28*a* of the actuator lever 28 is provided with a sliding portion 28*b* with the dog and cam not shown which receives operation and which is greatly bent upward in the drawing from an extension of the plate spring 25 at an angle of 45°, and is further bent at the sliding portion 28*b* at about 90°. Further, a top end portion 28*c* is bent along the side 30 of the housing 12 and hangs down almost in parallel. An upper portion of the housing side 30 is concavely provided with a notched portion 30*a*, which movably stores the top end portion 28*c*.

On the other hand, in the actuator lever top end portion 28*c* is piercingly provided a square hole 32 (see FIG. 3), and the notched portion 30*a* notches a position corresponding to almost a center of the square hole 32 and forms a control portion 30*b*, which is idly fitted to the square hole 32. Accordingly, the movement of the actuator lever 28 by a compelling force from the outside is controlled within a range where an inner edge of the square hole 32 abuts against the control portion 30*b*. Further, the left and right peripheral walls 30*c* remained on the outer periphery of the notched portion 30*a* and a counter surface 30*d* at the lower end of the top end portion 28*c* control excessive movement and function as a safety stopper.

Against the vicinity of the connecting portion with the plate spring 25 of the actuator lever 28, a spherically formed apex face of a head 36*a* of a piston 36, which transmits the movement of the actuator lever 28 to a non-contact type microswitch 34, abuts. A base 36*b* of the piston 36 is cylindrical, and on the upper end thereof, a seat 36*d* having a diameter slightly larger than the base 36*b* extends from an upper portion of a flange 36*c* expanded in diameter, and a center hole of the head 36*a* fits to a small diameter boss 36*e* protruding from a center of the seat 36*d*. A central portion of the disc bellows 38 of the elastic membrane formed by polyimide is insertingly mounted between the under surface of the head 36*a* and the upper surface of the boss 36*d*, and the joined surface thereof is completely sealed by polyimide. The disc bellows 38 has a coaxial wavelike convex-concave formed along a flat conical surface, and the same size diameter see-through hole as the boss 36*a* passes through the center.

As shown in FIG. 1(*b*), in the housing 12 is formed a cavity 42 opened to an under surface 40 in the drawing at the side opposing the upper surface 22, and is shown in FIG. 2 as a bottom view. From the upper surface 22 to the cavity 42 is passed a piercing hole 44 having steps. On the upper surface 22 to which the piercing hole 44 opens is formed an inclined plane annular concave portion 46 expanded upward in diameter, where a peripheral wall 46*a* expands upward, and a circumference where a peripheral wall 46*a* contacts an under surface 46*b* is allowed to abut against an outer periphery of the disk bellows 38 so as to be sealed by a bonding agent. In the under surface 46 is concavely provided a step portion 46*c* having a diameter slightly larger than an outer shape of the flange 36*b* which overhangs from the piston 36, and the step portion 46*c* controls a downward moving area of the flange 36*b* and functions as a safety stopper for an excessive external force in a vertical direction.

In the under portion of a reduced diameter cylindrical hole 46*d* communicating with the cavity 42 from the step portion 46*c* is carved an internal thread 48, and in the cavity 42, an opening expanded in diameter functions as a linear line guide portion 52 of a microswitch mounting board 50. The microswitch mounting board 50 is cylindrical, and in the top end portion thereof is provided an external thread 54 which is screwed into an internal thread 48 of a lower portion of the cylindrical hole 46*d*, and abase 56 is slidably fits to the linear line guide portion 52. The under portion in the drawing of the base 56 is expanded in diameter and forms a microswitch mounting seat 58, and is carved with a counter sinking hole 62 adapted to the outer shape of the ready-made non-contact type microswitch 34, and the ready-made non-contact type microswitch is fixed inside the hole 62 by adequate means. Note that a hole IC is utilized for the non-contact type microswitch 64.

In the center of the microswitch mounting board 50 is provided a through hole 50*a* so that a base 36*b* of the piston 36 is slidably fittingly mounted. The lower end portion of the through hole 50*a* is a sliding portion 50*b* which has little gap with the piston base 36*b*, and in the upper portion other than this is provided an escape way expanded in diameter. Between the under surface of the flange 36*c* of the piston and the upper surface of the external thread 54 of the microswitch mounting board is insertably mounted a compression coil 64, which energizes the piston 36 upward so that the apex surface of the piston head 36*a* is allowed to always abut against the under surface of the actuator lever 28. On the other hand, the lower end in the drawing of the piston 36 abuts against a top end of an operating pin (actuator) 34*a*, which is located at a free position of the ready-made microswitch 34. Since the microswitch 34 is a non-contact type, a return spring is weak, and in contrast to a contact which operates by a snap action of the conventional general industry limit switch, the microswitch 34 can be sufficiently functioned by an extremely slight operating force.

In order that the operating position of the contact is not largely affected by tares of the actuator lever 28 and the piston 36 depending on a mounting direction of the limit switch 10, elasticity of the plate spring 25, the disc bellows 38 and the compression coil spring 64 is comprehensively set. By rotation of the microswitch mounting board 50, the piston 36 and the compression coil spring 64 move together upwardly and downwardly to adjust a distance of an operating position (shown by two-dot chain line) relative to the free position of the actuator lever 28 shown in FIG. 1(*a*) by a solid line. After performing a prescribed operating position adjustment in a plant and drawing out a cable (not shown) wired in the non-contact type microswitch 34 from a distribution port 66 of the housing 12, the cavity 42 is sealed by silicon rubber or an epoxy filler.

As described above, while one embodiment of the limit switch according to the present invention is described based on the drawings, the invention is not limited to the illustrated embodiment, and it is expected that a variety of changes and modifications with respect to the details and alternation such as reconstitution of parts and the like can be performed in a range not deviating from the constituent features of the present invention. For example, as an operating indicator light, a light emitting diode 68 may be mounted.

As evidenced by the above-described explanation, according to the limit switch according to the present invention, since a micro-shaped non-contact type microswitch requiring a delicate attention in handling is sealed into a basic model limit switch, the microswitch can be handled as a sensor also for an extremely sensitive positioning, a displacement, a movement or a passage with a sense for usual machine parts, and moreover, the same operating sensitivity as the microswitch is guaranteed. By the convex portion and the concave portion which are provided on the mounting surface and fit to each other, mutual precise positioning can be easily performed in using the lamination layers of a plurality of microswitches.

Further, since the non-contact type microswitch is installed with the upper and lower positions adjustable, an appropriate operating position can be set. Furthermore, the actuator lever is supported by a cantilever plate spring, and the piston, which transmits the movement of the actuator lever to the non-contact type microswitch, is supported by a bellows-shaped elastic membrane. Since there exist no frictional portions, lubrication is not required, and since there exist no frictional components, durability is improved. Further, since the connecting portion between the bellows-shaped piston and the housing is sealed air tight and the non-contact type microswitch is sealed inside the cavity of the housing by the filler, the electrical contact is completely isolated from the external world, and the limit switch becomes completely a waterproof and dustproof type, so that use in water and oil and in bad surroundings where a lot of dusts abound is possible.

Further, since the actuator lever is formed by stainless steel (SUS304), and the surface thereof is subjected to nitriding processing, and the plate spring and the bellows-shaped elastic membrane are formed by polyimide, the actuator lever is excellent in erosion resistance and abrasion resistance. In addition, a moving range of the actuator lever is controlled by the protrusion of the housing side which idly fits inside the square hole of the top end, and moreover, the notched portion of the housing which stores the top end of the actuator lever can be allowed to function as a safety stopper. Further, for the downward movement in an excessive vertical direction, which acts on the actuator lever, since the lower step of the disc bellows elastic membrane prevents the downward movement of the piston flange, the non-contact type microswitch can be prevented from being affected by unreasonable external force.

On the other hand, since the compression coil spring insertably mounted between the piston and the microswitch mounting board supports the urging force by the tare of the piston and the wavelike elastic membrane, regardless of a mounting posture of the limit switch, a stable constant operating position can be secured, and the microswitch mounting board can precisely set the operating position for the free position of the microswitch by the actuator by a slight adjustment by a screw mechanism.

What is claimed is:

1. A limit switch comprising:

a housing;

a non-contact type microswitch provided inside a cavity of the housing;

an actuator lever supported on an upper surface of the housing by a cantilever plate spring;

a piston provided between and connecting the actuator lever and the microswitch; and an elastic membrane for sealing the piston, wherein, on two surfaces functioning as mounting surfaces of the housing, small protrusions are convexly provided on at least two positions on one of the surfaces, and hole portions sized to the small protrusions are concavely provided on corresponding positions on the other one of the surfaces.

2. The limit switch according to claim 1, wherein the plate spring is formed by polyimide.

3. The limit switch according to claim 1, wherein the elastic membrane comprises a disc bellows having an inclination along a flat conical surface and the disc bellows is formed by polyimide as a raw material.

4. The limit switch according to claim 1, wherein the actuator lever comprises stainless steel and a surface thereof is subjected to nitriding processing.

5. A limit switch comprising:

a housing;

a non-contact type microswitch provided inside a cavity of the housing;

an actuator lever supported on an upper surface of the housing by a cantilever plate spring, a top end of the actuator lever being extended to a housing side, said actuator lever including a hole which controls a moving range of the lever, the hole being provided at a position facing the housing side for fitting to a protrusion of the housing side;

a piston provided between and connecting the actuator lever and the microswitch; and an elastic membrane for sealing the piston.

6. A limit switch comprising:

a housing;

a non-contact type microswitch provided inside a cavity of the housing;

an actuator lever supported on an upper surface of the housing by a cantilever plate spring;

a piston provided between and connecting the actuator lever and the microswitch;

an elastic membrane for sealing the piston, and a compression coil spring insertably mounted between the piston and a mounting board of the microswitch for supporting the piston and opposing an urging force of the elastic membrane.

7. The limit switch according to claim 6, wherein the mounting board of the microswitch includes an external thread on an outer periphery thereof for screwing to an internal thread provided on a hole of the housing.

8. The limit switch according to claim 7, wherein the mounting board of the microswitch is rotatable so as to move a position of the piston relative to the actuator lever by a screw mechanism and to adjust a distance of an operating position for the actuator lever relative to a free position of the microswitch.

9. The limit switch according to claim 1, including a filler material inside the cavity to seal the microswitch so that the limit switch is water resistant.

10. A limit switch comprising:

a housing including an aperture extending therethrough and opening at one end into a cavity in the housing and opening at the other end outwardly from a side wall of said housing;

an actuator secured to said housing and positioned adjacent the aperture at the side wall of said housing;

a microswitch secured to said housing and positioned in the cavity;

a piston disposed in and extending the entire length of the aperture, said piston having a first end for contacting said microswitch in the cavity and a second end protruding from the aperture for contacting said actuator; and an elastic membrane positioned about a portion of the second end of said piston and sealing the aperture at the side wall of said housing, wherein said piston transfers physical movement of said adjacent actuator toward said microswitch.

11. The limit switch according to claim 10, wherein said actuator comprises an actuator lever secured at one end to the side wall of the housing by a cantilever spring plate.

12. The limit switch according to claim 10, including a filler material located inside the cavity to seal the microswitch so that the limit switch is water resistant.

* * * * *